(12) United States Patent
Kamijima

(10) Patent No.: US 7,492,506 B1
(45) Date of Patent: Feb. 17, 2009

(54) WAVELENGTH CONVERTING ELEMENT, LIGHT SOURCE DEVICE, LIGHTING DEVICE, MONITORING DEVICE, AND PROJECTOR

(75) Inventor: Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/170,197

(22) Filed: Jul. 9, 2008

(30) Foreign Application Priority Data

Jul. 27, 2007 (JP) .............................. 2007-195516

(51) Int. Cl.
*G02F 1/35* (2006.01)
(52) U.S. Cl. ........................................ 359/326; 372/21
(58) Field of Classification Search ......... 359/326–330; 372/21–23
See application file for complete search history.

(56) References Cited

U.S. PATENT DOCUMENTS

| 7,218,653 | B2 * | 5/2007 | Masada et al. ................. 372/21 |
| 2006/0023173 | A1 | 2/2006 | Mooradian et al. |
| 2006/0023757 | A1 | 2/2006 | Mooradian et al. |
| 2006/0268241 | A1 | 11/2006 | Watson et al. |
| 2006/0280219 | A1 | 12/2006 | Shchegrov |
| 2007/0153862 | A1 | 7/2007 | Shchegrov et al. |
| 2007/0153866 | A1 | 7/2007 | Shchegrov et al. |

FOREIGN PATENT DOCUMENTS

JP 06-289446 10/1994

OTHER PUBLICATIONS

Aram Mooradian, et al., High Power Extended Vertical Cavity Surface Emitting Diode Lasers and Arrays and Their Applications, Micro-Optics Conference, Nov. 2, 2005, pp. 1-4, Tokyo.
Ondax, Inc., Volume Holographic Gratings (VHG), http://www.ondaxinc.com/PDFs/whitepaper-VHG.pdf, pp. 1-7, 2005.

\* cited by examiner

*Primary Examiner*—Hemang Sanghavi
(74) *Attorney, Agent, or Firm*—AdvantEdge Law Group, LLC

(57) ABSTRACT

The disclosure refers to a wavelength converting element, light source device, lighting device, monitoring device, and projector. In one example, a wavelength converting element comprises a polarization-inverted crystal including polarization-inverted layers having an inverted polarization direction and being disposed in parallel in a particular direction. The polarization-inverted layers are disposed substantially parallel with a first plane which is substantially orthogonal to the particular direction. Temperature controlling elements are configured to control a temperature of the polarization-inverted crystal, the temperature controlling elements being disposed on a second plane substantially orthogonal to the first plane.

17 Claims, 11 Drawing Sheets

WAVELENGTH CONVERTING ELEMENT, LIGHT SOURCE DEVICE, LIGHTING DEVICE, MONITORING DEVICE, AND PROJECTOR

CROSS-REFERENCE

The present application claims priority from Japanese Patent Application No. 2007-195516 filed on Jul. 27, 2007, which is hereby incorporated by reference in its entirety.

BACKGROUND

A light source device of a projector using a laser beam source has been proposed. The laser beam source having relatively high output and producing multiple color lights has been developed as a light source of a projector. The laser beam source may includes advantages such as high color reproducibility, immediate lighting, and long life when compared with a UHP lamp used as a light source in a projector. Examples of laser beam sources currently known in the industry involve a type which emits fundamental wave light from the light source without wavelength change, and a type which converts the wavelength of fundamental wave light before emission. The wavelength converting element known for converting the wavelength of the fundamental wave light is, for example, a second-harmonic generation (SHG) element. When the SHG element is employed, a sufficient amount of laser beams having desired wavelength are supplied by using a general-purpose light source easily available. JP-A-6-289446 refers to a technology for a wavelength converting element for obtaining a stable amount of higher harmonic light with high efficiency, for example. The technology proposed in this document produces a temperature difference between the light entering surface of a non-linear optical crystal and the light emitting surface thereof.

It is known in the industry that the phase matching condition of the SHG element collapses when the refractive index distribution changes due to temperature variations. As such, the wavelength conversion efficiency lowers. When the non-linear optical crystal has temperature slope, a part having collapse of phase matching condition appears within the non-linear optical crystal. This part having collapse of phase matching condition lowers the wavelength conversion efficiency of the wavelength converting element. Accordingly, achieving high wavelength conversion efficiency is difficult in such existing technology configurations.

SUMMARY

A wavelength converting element, light source device, lighting device, monitoring device, and projector have been developed in response to the current state of the art, and in particular, in response to these and other problems, needs, and demands that have not been fully or completely solved by currently available display devices. More specifically, various embodiments described in the disclosure provide a wavelength converting element capable of achieving a relatively high wavelength conversion efficiency and adjustable at a predetermined phase matching temperature in a relatively short time, and provide a light source device, a lighting device, a monitoring device, and a projector using the wavelength converting element.

A wavelength converting element configured to receive light having a first wavelength and produces light having second wavelength different from the first wavelength according to the present disclosure may include a polarization-inverted crystal containing polarization-inverted layers which has inverted polarization direction and are disposed in parallel in a particular direction, and a plurality of temperature controlling elements which control the temperature of the polarization-inverted crystal. The polarization-inverted layers may be disposed substantially parallel with a first plane substantially orthogonal to the particular direction. The plural temperature controlling elements may be disposed on a second plane substantially orthogonal to the first plane.

The temperatures of polarization-inverted layers and spontaneous polarization layers constituting the polarization inverted structure may be uniformly controlled by disposing the plural temperature controlling elements on the second plane. Moreover, fluctuations in temperature of the polarization-inverted crystal may be reduced by controlling the plural temperature controlling elements in an appropriate manner. By decreasing temperature variation of the polarization-inverted crystal from the set temperature, the wavelength conversion efficiency may be increased. As such, the wavelength converting element adjustable to a predetermined phase matching temperature in a short time and capable of achieving high wavelength conversion efficiency may be obtained.

The temperature controlling elements may include a first temperature controlling element and a second temperature controlling element having larger capacity than that of the first temperature controlling element. When the first temperature controlling element and the second temperature controlling element are used, highly accurate temperature control may be performed according to the difference between the set temperature and the measured temperature of the polarization-inverted crystal.

The first temperature controlling element and the second temperature controlling element may supply heat so that the temperature of the polarization-inverted crystal becomes a set temperature. In this case, the second temperature controlling element may stop temperature control when the difference between the set temperature and the temperature of the polarization-inverted crystal lies within a fixed value. As such, the temperature of the polarization-inverted crystal may be increased to the set temperature in a relatively short time, and shift of the temperature from the set temperature may be reduced. Furthermore, the time required for startup of the device may be reduced and immediate lighting achieved.

The second temperature controlling element may be disposed substantially at the center of the second plane. In this case, the temperature of the polarization-inverted crystal may be uniformly increased in a short time.

A heat diffusing section which diffuses heat to be conducted to the polarization-inverted crystal may also be included. In this case, the temperature of the polarization-inverted crystal may be further equalized.

Connecting sections which connect the temperature controlling elements with the heat diffusing section, and an insulating layer disposed on the heat diffusing section on the side opposite to the polarization-inverted crystal in the area other than the area having the connecting sections may be included. According to this structure, unnecessary continuity between wires connected with the temperature controlling elements may be cut off, and heat from the temperature controlling elements may be efficiently conducted to the heat diffusing section. Assembly may be facilitated by directly mounting the temperature controlling elements on the insulating layer.

A heat releasing section disposed on the temperature controlling elements on the side opposite to the polarization-inverted crystal to release heat may be included. When the temperature controlling elements are constituted by Peltier elements or the like having heat pump function, efficient heat supply to the polarization-inverted crystal may be achieved by providing the heat releasing section. As such, highly efficient temperature control may be performed.

The temperature controlling elements may be disposed on the second plane and a third plane as a plane opposite to the second plane. In this case, the temperature of the polarization-inverted crystal may be equalized in the direction orthogonal to the second and third planes.

A light source device according to at least one embodiment includes a light source unit which emits light having first wavelength, and a wavelength converting element which receives light having the first wavelength from the light source unit and produces light having second wavelength different from the first wavelength. The wavelength converting element is the wavelength converting element described above. The wavelength of light emitted from the light source unit may be converted with high efficiency by using the wavelength converting element described above. As such, a light source device capable of emitting a stable amount of light with high efficiency can be obtained.

A lighting device according to at least one embodiment has the light source device described above and illuminates an illumination target by using light emitted from the light source device. By using the light source device, a stable amount of light may be emitted with high efficiency. As such, a lighting device capable of supplying a stable amount of light with high efficiency may be obtained.

A monitoring device according to at least one embodiment includes the lighting device described above, and an image-pickup unit which picks up an image of a subject illuminated by the lighting device. By using the lighting device described above, a stable amount of light may be supplied with high efficiency. As such, a monitoring device capable of monitoring a stable and bright image may be obtained.

A projector according to at least one embodiment has the light source device described above and displays an image by using light emitted from the light source device. By using the light source device described above, a stable amount of light may be emitted with high efficiency. As such, a projector capable of displaying a stable and bright image may be obtained.

BRIEF DESCRIPTION OF THE DRAWINGS

Embodiments of the disclosure are described with reference to the accompanying drawings, wherein like numbers refer to like elements.

DESCRIPTION OF EXEMPLARY EMBODIMENTS

In the following description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure may defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The meaning of "in" may include "in" and "on." The appearances of the phrases "in one embodiment" or "in an embodiment" in various places in the specification do not necessarily all refer to the same embodiment, but it may.

Figure 1:
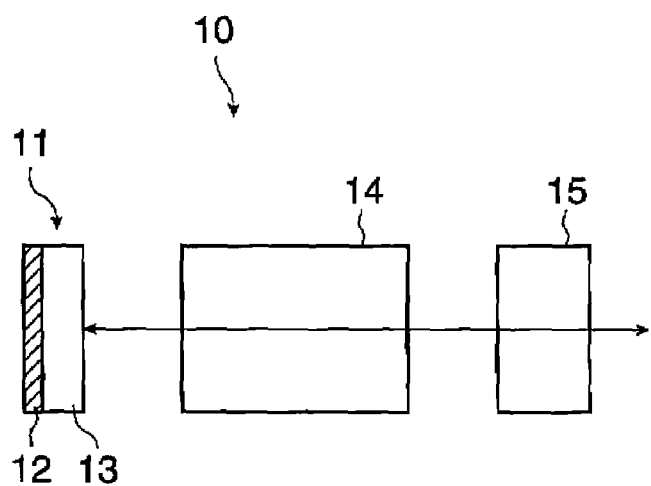
FIG. 1 illustrates a general structure of a light source device according to at least one embodiment.

FIG. 1 illustrates a general structure of a light source device 10 in at least one embodiment. The light source device 10 is a semiconductor laser having a semiconductor element 11, an SHG element 14, and an external resonator 15. The semiconductor element 11 is a light source unit which emits fundamental wave light having first wavelength such as a surface emission type semiconductor element. The first wavelength is 1064 nm, for example. The semiconductor element 11 has a mirror layer 12 which reflects first wavelength light, and an activated layer 13 laminated on the mirror layer 12.

The mirror layer 12 is a lamination body constituted by a guiding member having high refractive index and a guiding member having low refractive index. The mirror layer 12 having the optimal structure for the first wavelength as the wavelength of the fundamental wave light emitted from the semiconductor element 11 is designed such that the fundamental wave light interferes with each other and intensifies each other. When predetermined amount of current is supplied from a not-shown current supply unit, the activated layer 13 emits the fundamental wave light having the first wavelength.

The SHG element 14 is a wavelength converting element which receives the fundamental wave light having the first wavelength and emits higher harmonic light having second wavelength. The SHG element 14 is disposed on the optical path between the semiconductor element 11 and the external resonator 15. The second wavelength is half of the first wavelength such as 532 nm.

The external resonator 15 resonates light from the semiconductor element 11 within a space between the mirror layer 12 and the external resonator 15. The external resonator 15 selectively reflects the first wavelength light and transmits light having wavelengths other than the first wavelength (including the second wavelength). The external resonator 15 is constituted by a VHG (volume holographic grating), for example. The VHG is produced by using photo-refractive crystal such as $LiNbO_3$ and BGO and polymer (for example, volume holographic grating (VHG), manufactured by Ondax Inc., see URL: http://www.ondaxinc.com/PDFs/whitepaper-VHG.pdf).

The VHG records interference fringes produced by lights entering in two directions. The interference fringes are recorded as a cyclic structure having high refractive index parts and low refractive index parts cyclically arranged. The VHG selectively reflects only light whose Bragg condition matches with that of the interference fringes by diffraction. The external resonator 15 has a rectangular parallelepiped shape. The external resonator 15 is a component produced by cutting a plate-shaped material into a part. The external resonator 15 obtains the desired size by appropriately varying the thickness of the material before cutting or the size of the part cut from the material.

The fundamental wave light emitted from the activated layer 13 of the semiconductor element 11 enters the SHG element 14. The higher harmonic light produced by the SHG element 14 passes through the external resonator 15 and goes out of the light source device 10. The fundamental wave light having passed through the SHG element 14 from the semiconductor element 11 is reflected by the external resonator 15. The fundamental wave light reflected by the external resonator 15 enters the SHG element 14. The fundamental wave light having reached the SHG element 14 from the external resonator 15 and passed through the SHG element 14 enters the semiconductor element 11. The fundamental wave light having entered the semiconductor element 11 is reflected by the mirror layer 12, and emitted from the semiconductor element 11 toward the SHG element 14. The fundamental wave light reflected by the mirror layer 12 and the external resonator 15 resonates with fundamental wave light newly emitted from the activated layer 13 for amplification.

Figure 2:
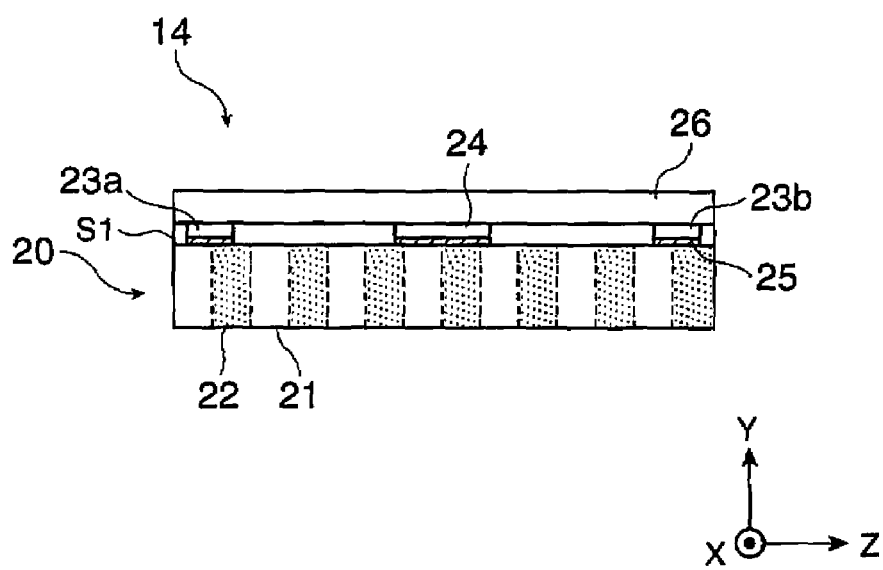
FIG. 2 illustrates a cross-sectional structure of an SHG element.

FIG. 2 illustrates a cross-sectional structure of the SHG element 14. The SHG element 14 has a polarization-inverted crystal 20. The polarization-inverted crystal 20 is polarization-inverted crystal of lithium niobate ($LiNbO_3$) as a non-linear optical crystal (periodically poled lithium niobate; PPLN), for example. The polarization-inverted crystal 20 has a polarization-inverted structure containing spontaneous polarization layers 21 and polarization-inverted layers 22 alternately arranged in parallel. The spontaneous polarization layers 21 and the polarization-inverted layers 22 are located in parallel in a Z-axis direction as a particular direction for transmitting light.

Figure 3:
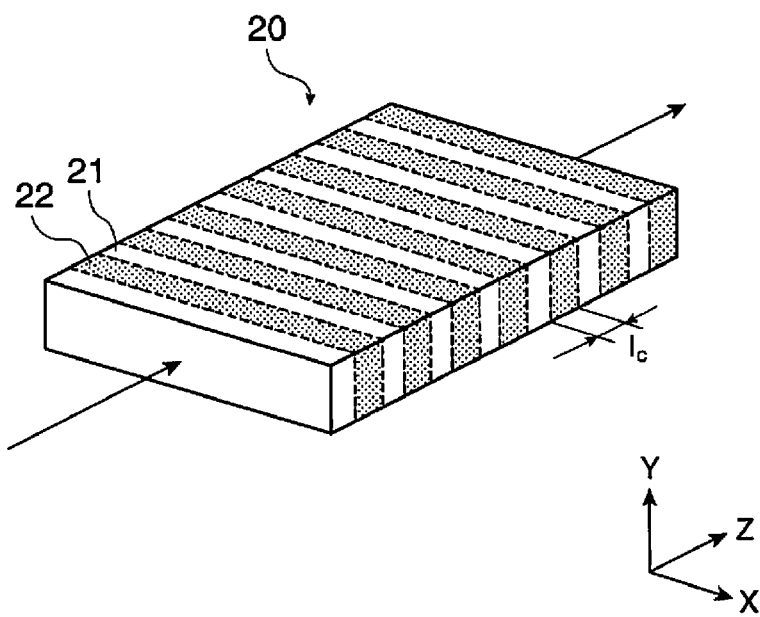
FIG. 3 illustrates a polarization-inverted structure of a polarization-inverted crystal.

FIG. 3 illustrates the polarization-inverted structure of the polarization-inverted crystal 20. The figure schematically shows the spontaneous polarization layers 21 and the polarization-inverted layers 22. The polarization-inverted structure is produced by inverting sign of a non-linear optical constant d for each coherent length $1_c$. In many cases, the polarization-inverted structure is produced by applying voltage to non-linear optical crystal having spontaneous polarization. The polarization-inverted structure is obtained, for example, by forming small patterns of insulating layers on a lithium niobate (LN) substrate and applying voltage thereto via metal layer or electrolyte. The polarization-inverted layers 22 are laminated areas having inverted polarization direction of the spontaneous polarization of the non-linear optical crystal contained in the polarization-inverted crystal 20. The spontaneous polarization layers 21 are laminated areas retaining the spontaneous polarization of the non-linear optical crystal contained in the polarization-inverted crystal 20. The spontaneous polarization layers 21 and the polarization-inverted layers 22 are provided substantially in parallel with an X-Y plane as a first plane orthogonal to the Z-axis direction.

Figure 4:
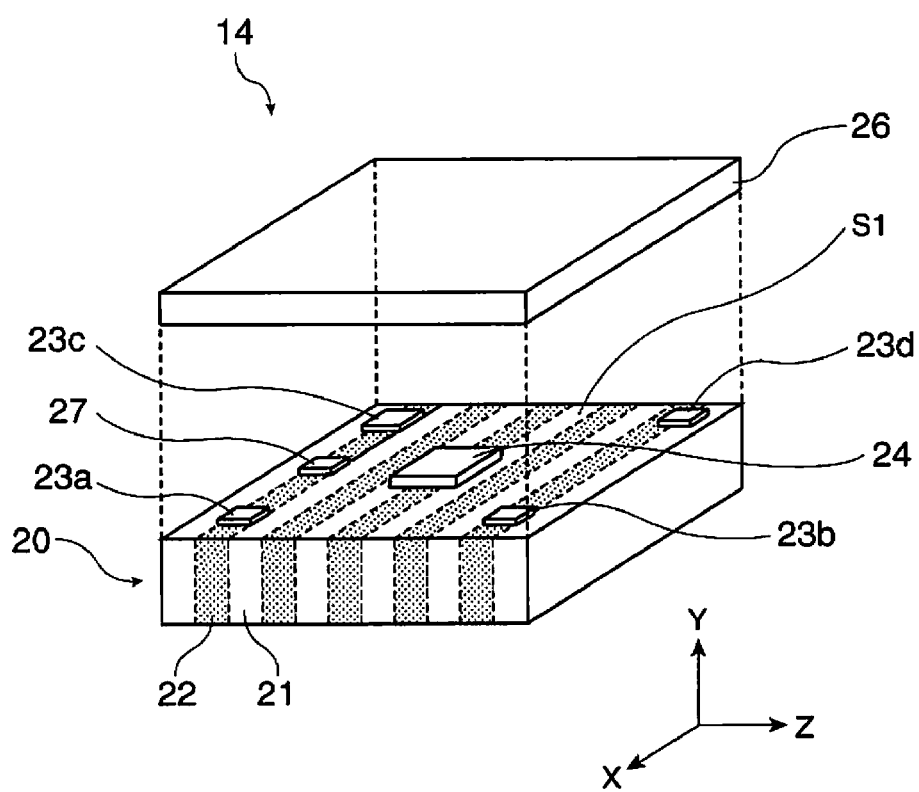
FIG. 4 illustrates an arrangement of main heaters, a sub heater, and a thermistor.

FIG. 4 illustrates arrangement of main heaters 23a through 23d, a sub heater 24, and a thermistor 27. The main heaters 23a through 23d, the sub heater 24, and the thermistor 27 are disposed on an upper surface S1 of the polarization-inverted crystal 20. The upper surface S1 is an X-Z plane as a second plane substantially orthogonal to the X-Y plane as a first plane. The main heaters 23a through 23d and the sub heater 24 are temperature controlling elements for controlling the temperature of the polarization-inverted crystal 20 by supplying heat to the polarization-inverted crystal 20.

The main heaters 23a through 23d as first temperature controlling elements have capacities substantially equivalent to one another. The sub heater 24 as a second temperature controlling element has a capacity larger than those of the main heaters 23a through 23d. The main heaters 23a through 23d and the sub heater 24 are constituted by Peltier elements, for example. The temperatures of the respective spontaneous polarization layers 21 and polarization inverted layers 22 can be uniformly controlled by disposing the main heaters 23a through 23d and the sub heater 24 on the upper surface S1.

The four main heaters 23a through 23d are positioned in the vicinities of the respective corners of the rectangular upper surface S1. The sub heater 24 is disposed substantially at the center of the upper surface S1. The temperature of the polarization-inverted crystal 20 can be equalized by positioning the main heaters 23a through 23d and the sub heater 24 on the upper surface S1 with a space left between one another. As illustrated in FIG. 2 showing the cross-sectional structure, the main heaters 23a and 23b and the sub heater 24 are fixed to the upper surface S1 via adhesive layer 25. The not-shown main heaters 23c and 23d are also fixed to the upper surface S1 via the adhesive layer 25.

The adhesive layer 25 is constituted by a heat conductive adhesive. For example, the heat conductive adhesive is produced by adding heat conductive fillers such as metal particles to flexible material such as acrylic material. When the adhesive layer 25 is made of hardening material, stress may be given to the surface of the adhesive boundary by the contraction of the material caused by hardening. When the polarization-inverted structure is distorted by this stress, the phase matching condition collapses. In this case, the wavelength conversion efficiency is difficult to increase. Thus, using flexible material as material of the adhesive layer 25 is more preferable.

The thermistor 27 is a temperature measuring unit for measuring the temperature of the polarization-inverted crystal 20. The thermistor 27 is disposed between the two main heaters 23a and 23c on the upper surface S1. The position of the thermistor 27 may be arbitrarily determined when the temperature of the polarization-inverted crystal 20 can be measured. A heat releasing section (e.g., a radiating plate 26) is disposed on the main heaters 23a through 23d, sub heater 24, and thermistor 27 on the side opposite to the polarization-inverted crystal 20. The radiating plate 26 is a rectangular component having substantially the same size as that of the polarization-inverted crystal 20. The radiating plate 26 functions as a radiation unit which releases heat. Peltier elements shift heat from metal components on one side to metal components on the other side by supplying current to the junctions of two types of metal components. The main heaters 23a through 23d and sub heater 24 can efficiently supply heat to the polarization-inverted crystal 20 by heat radiation using the radiating plate 26 disposed on the side opposite to the polarization-inverted crystal 20.

Figure 5:
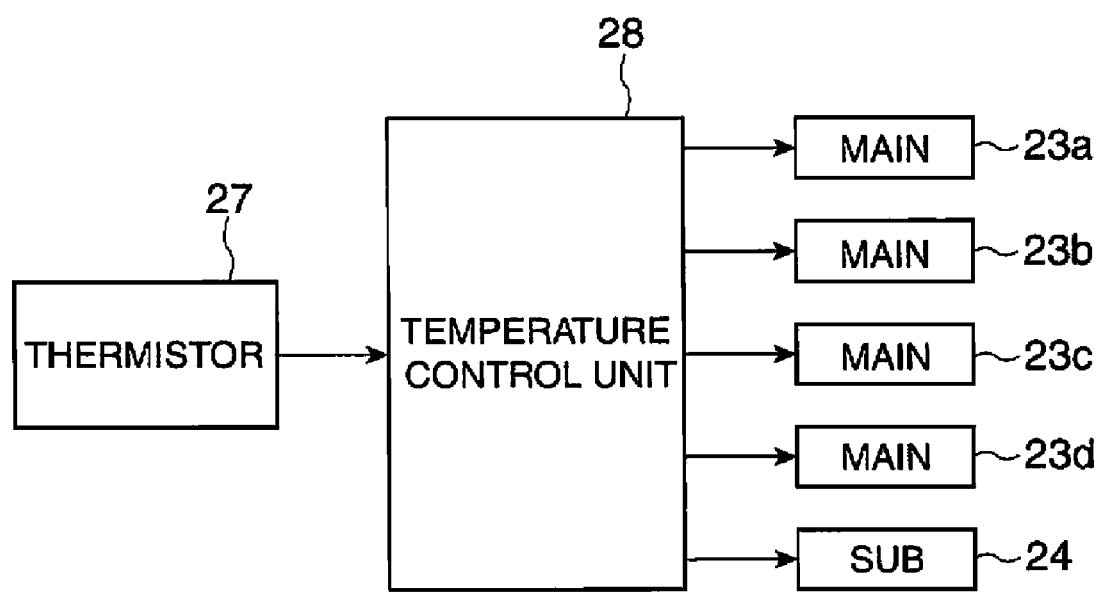
FIG. 5 is block diagram showing a structure for controlling the temperature of the polarization-inverted crystal.

FIG. 5 is a block diagram showing a structure for controlling the temperature of the polarization-inverted crystal 20 based on the measurement result of the thermistor 27. The thermistor 27 outputs temperature change to a temperature control unit 28 as resistance variation. The temperature control unit 28 calculates the power amount to be supplied to the main heaters 23a through 23d and sub heater 24 based on the difference between the measurement temperature measured by the thermistor 27 and predetermined set temperature, and supplies power according to the calculated power amount to the main heaters 23a through 23d and sub heater 24. When the temperature of the polarization-inverted crystal 20 is the set temperature, the phase matching condition is satisfied. The sub heater 24 can be operated separately from the main heaters 23a through 23d. The main heaters 23a through 23d may be operated either individually or collectively.

Figure 6:
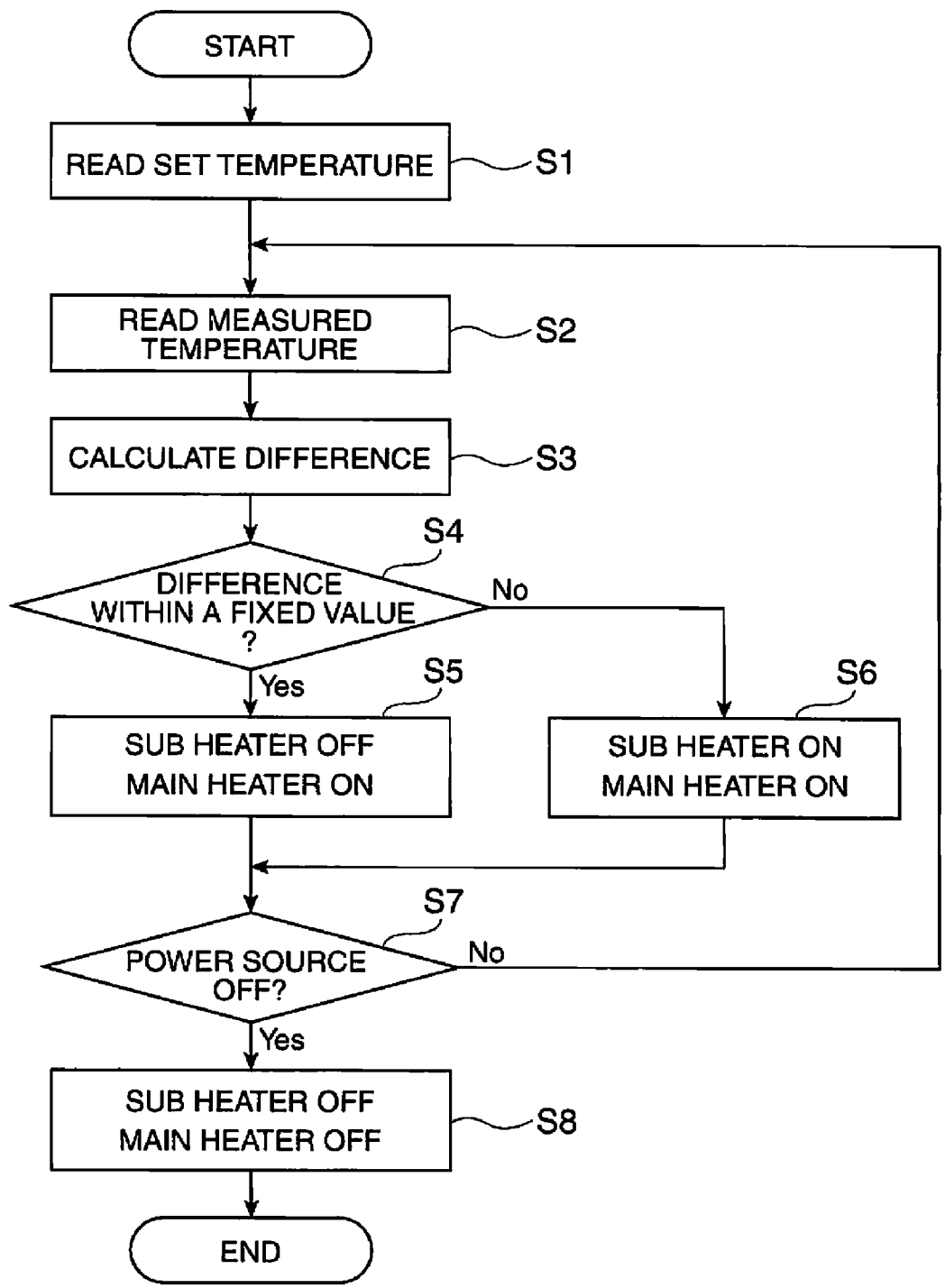
FIG. 6 is a flowchart depicting processing for controlling the temperature of the polarization-inverted crystal.

FIG. 6 is a flowchart showing processing for controlling the temperature of the polarization-inverted crystal 20. When the power source of the light source device 10 is turned on, the temperature control unit 28 reads the set temperature established for the polarization-inverted crystal 20 in step S1. In step S2, the temperature control unit 28 reads the temperature measured by the thermistor 27. In step S3, the temperature control unit 28 calculates the difference between the measured temperature read in step S2 and the set temperature read in step S1.

In step S4, the temperature control unit 28 judges whether the difference calculated in step S3 lies within a fixed value. The fixed value as the basis for judgment is the difference between the set temperature and a predetermined threshold equal to or lower than the set temperature. When it is judged that the difference lies out of the fixed value in step S4, the temperature is controlled by using both the main heaters 23a through 23d and the sub heater 24 in step S6. The judgment that the difference is out of the fixed value corresponds to the condition in which the measured temperature is lower than the threshold value.

When it is determined that the difference lies within the fixed value in step S4, the sub heater 24 stops operation in step S5 maintaining temperature control only by the main heaters 23a through 23d. The judgment that the difference is within the fixed value corresponds to the condition in which the measured temperature is equal to or higher than the threshold value. The temperature control mode in step S5 and the temperature control mode in step S6 can be easily switched by turning on and off the sub heater 24.

After steps S5 and S6, the temperature control unit 28 judges whether the power source of the light source device 10 has been turned off in step S7. When it is judged that the power source of the light source device 10 has been turned off in step S7, all of the main heaters 23a through 23d and the sub heater 24 stop operation in step S8. When it is judged that the power source of the light source device 10 has not been turned off in step S7, the process returns to step S2, where the temperature control unit 28 reads the measured temperature.

Figure 7:
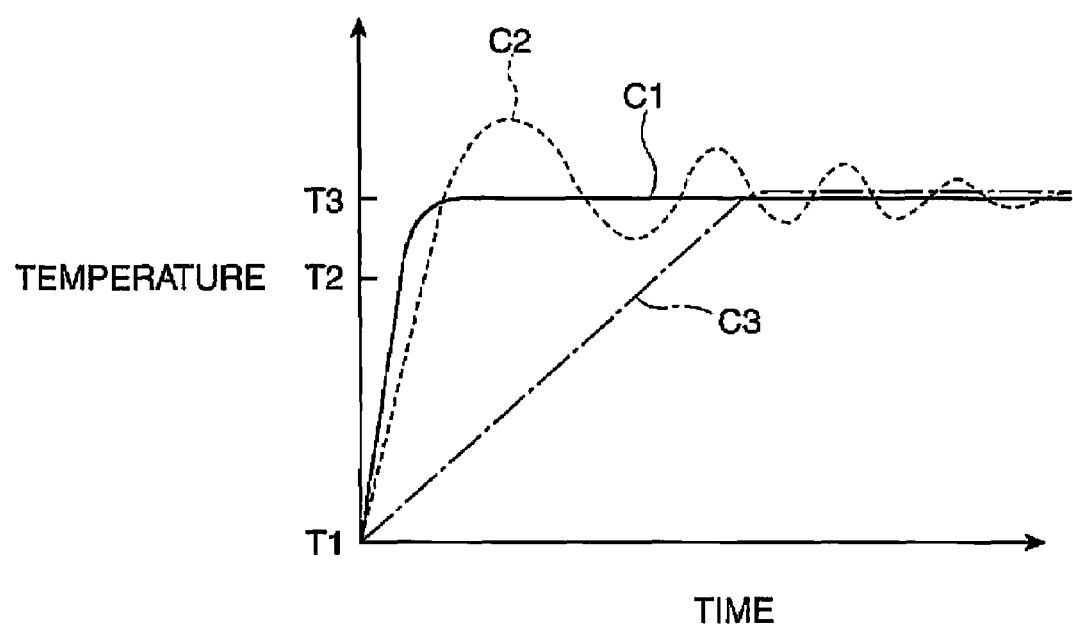
FIG. 7 depicts temperature changes of the polarization-inverted crystal.

FIG. 7 shows the temperature changes of the polarization-inverted crystal 20. The vertical axis in the figure indicates the temperature of the polarization-inverted crystal 20, and the horizontal axis indicates time. A solid curve C1 shows the temperature variations of the polarization-inverted crystal 20 in this embodiment. Broken curve C2 and dashed curve C3 show temperature variations in comparison examples. The processes performed until the temperature of the polarization-inverted crystal 20 rising from a room temperature T1 is stabilized at a set temperature T3 are now described.

While the power source of the light source device 10 is ON, the temperature control unit 28 constantly reads the temperature of the polarization-inverted crystal 20 measured by the thermistor 27. When the temperature of the polarization-inverted crystal 20 is lower than a threshold T2, the main heaters 23a through 23d and the sub heater 24 supply heat to the polarization-inverted crystal 20. By the temperature control using the main heaters 23a through 23d and the sub heater 24, the temperature of the polarization-inverted crystal 20 rises with elapse of time. The temperature on the upper surface S1 of the polarization-inverted crystal 20 can be equalized by separately positioning the main heaters 23a through 23d and the sub heater 24 on the upper surface S1. Also, the heat from the sub heater 24 having large capacity can be easily transmitted throughout the upper surface S1 by disposing the sub heater 24 substantially at the center of the upper surface S1.

When the temperature of the polarization-inverted crystal 20 reaches the threshold temperature T2 or higher, the sub heater 24 stops temperature control. The temperature rise of the polarization-inverted crystal 20 gradually becomes slow by stopping the sub heater 24 having large capacity and supplying heat only by the main heaters 23a through 23d having small capacity. As a result, the temperature of the polarization-inverted crystal 20 is stabilized at the set temperature T3 by the control of the main heaters 23a through 23d. Thus, the temperature control unit 28 performs feedback control of the main heaters 23a through 23d and the sub heater 24 based on the measurement result of the thermistor 27.

It is possible to employ PID control for controlling the main heaters 23a through 23d and sub heater 24, which controls input value (power amount) using factors such as difference between output value (measured temperature) and target value (set temperature T3), and integral and differential of the difference. When the measured temperature of the polarization-inverted crystal 20 is lower than the threshold T2, the temperature control unit 28 executes proportional control (P) such that the power amount supplied to the main heaters 23a through 23d and the sub heater 24 becomes proportional to the difference between the measured temperature and the set temperature T3. By this method, the temperature of the polarization-inverted crystal 20 rises to the set temperature T3 in a short time.

When the measured temperature of the polarization-inverted crystal 20 is equal to or higher than the threshold T2, the temperature control unit 28 performs integral control (D) for stopping power supply to the sub heater 24 and gradually decreasing the amount of power to the main heaters 23a through 23d. By this method, hunting (oscillation) of the temperature of the polarization-inverted crystal 20 upward and downward from the set temperature T3 can be reduced. When the measured temperature reaches the set temperature T3, the temperature control unit 28 performs integral control (I) for controlling the amount of power to the main heaters 23a through 23d such that the difference between the measured temperature and the set temperature T3 can be eliminated. By this method, the temperature of the polarization-inverted crystal 20 can be stabilized at the set temperature T3. The threshold T2 is a temperature at which hunting can be sufficiently reduced by the operation of only the main heaters 23a through 23d, and can be arbitrarily determined. The time required until the temperature of the polarization-inverted crystal 20 reaches the set temperature T3 can be shortened by setting the threshold T2 at a closest possible temperature to the set temperature T3.

When heat is supplied to the polarization-inverted crystal 20 only by the sub heater 24, the temperature of the polarization-inverted crystal 20 can be increased to the set temperature T3 in a short time as indicated by the curve C2 similarly to this embodiment. It is difficult, however, for the sub heater 24 having large capacity to achieve fine adjustment sufficient for eliminating the difference between the measured temperature and the set temperature T3. In this case, the temperature of the polarization-inverted crystal 20 repeatedly rises and falls with respect to the set temperature T3 for a certain period, and thus requires a long time until stabilized at the set temperature T3.

When heat is supplied to the polarization-inverted crystal 20 only by the main heaters 23*a* through 23*d*, the temperature of the polarization-inverted crystal 20 raised to the set temperature T3 can be stabilized at the set temperature T3 as indicated by the curve C3 similarly to this embodiment. It is difficult, however, for the main heaters 23*a* through 23*d* having small capacity to raise the temperature of the polarization-inverted crystal 20 from the room temperature T1 to the set temperature T3 in a short time. In this case, the temperature of the polarization-inverted crystal 20 requires a long time to reach the set temperature T3. Moreover, the temperature of the polarization-inverted crystal 20 is difficult to return to the set temperature T3 in a short time when the temperature of the polarization-inverted crystal 20 changes for some reason during operation of the light source device 10.

The light source device 10 according to this embodiment can reduce the time for raising the temperature of the polarization-inverted crystal 20 and stabilize the temperature of the polarization-inverted crystal 20 at the set temperature T3 by using the main heaters 23*a* through 23*d* and the sub heater 24. Since the temperature of the polarization-inverted crystal 20 is fixed substantially at the set temperature T3, the SHG element 14 can convert the wavelength of the fundamental wave light emitted from the semiconductor element 11 with high efficiency. Thus, the light source device 10 can emit a stable amount of laser beams with high efficiency. There is a possibility that the temperature of the polarization-inverted crystal 20 varies by fluctuations in the peripheral temperature or for other reason at the time of startup of the light source device 10 or during the operation of the light source device 10. In this case, similar control is performed according to the difference between the measured temperature and the set temperature T3 to emit a stable amount of laser beams. Accordingly, emission of a stable amount of light with high efficiency can be achieved.

The light source device 10 may perform feed-forward control over the main heaters 23*a* through 23*d* and the sub heater 24. The feed-forward control is carried out based on the detection result of the factor for changing the temperature of the polarization-inverted crystal 20 such as peripheral temperature of the light source device 10, and output from the semiconductor element 11. Similar control is performed based on these detection results to obtain a stable amount of light in a short time. The main heaters 23*a* through 23*d* and the sub heater 24 can be controlled prior to the temperature change of the polarization-inverted crystal 20 by co-using the feed-forward control. In this case, a further stable amount of laser beams can be emitted. The structure of the light source device 10 is not limited to the type which controls the main heaters 23*a* through 23*d* and the sub heater 24 based on the temperature measured by the thermistor 27.

Figure 8:
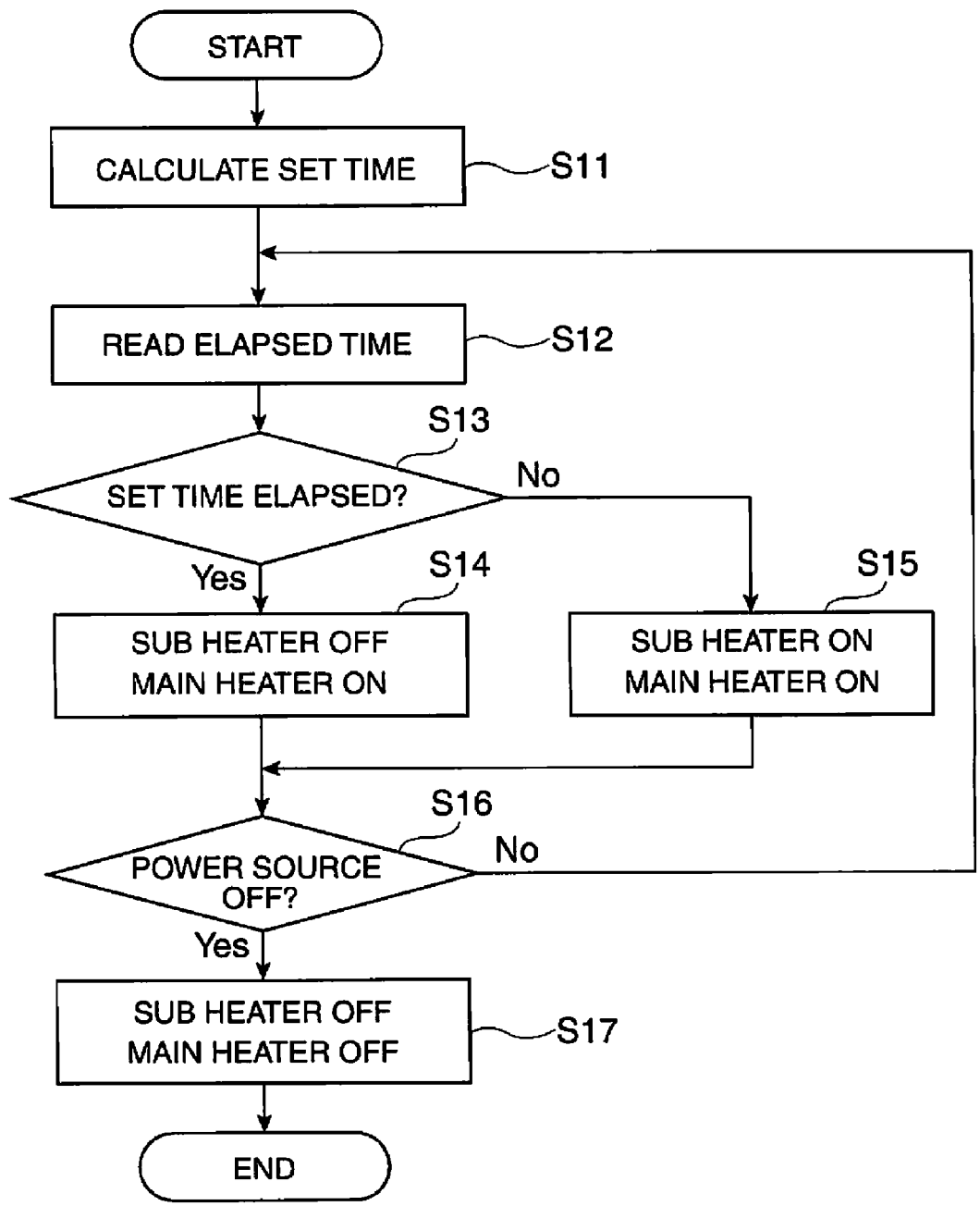
FIG. 8 is a flowchart depicting other processing for controlling the temperature of the polarization-inverted crystal.

FIG. 8 is a flowchart showing other processing for controlling the temperature of the polarization-inverted crystal 20. In this process, the relationship between the elapsed time after the power source of the light source device 10 is turned on and the temperature of the polarization-inverted crystal 20 is established beforehand, and the main heaters 23*a* through 23*d* and the sub heater 24 are controlled based on the elapsed time. The elapsed time after the power source of the light source device 10 is turned on can be measured by using a timer or the like. When the power source of the light source device 10 is turned on, the temperature control unit 28 calculates the set time in step S11. The set time is the time required until the temperature of the polarization-inverted crystal 20 rises from the room temperature T1 to the threshold T2 by the heat supply from the main heaters 23*a* through 23*d* and the sub heater 24. In step S12, the temperature control unit 28 reads the elapsed time measured by the time or the like.

In step S13, the temperature control unit 28 judges whether the set time has elapsed. When it is judged that the set time has not elapsed yet in step S13, the temperature control unit 28 performs temperature control by using both the main heaters 23*a* through 23*d* and the sub heater 24 in step S15. When it is judged that the set time has already elapsed in step S13, the temperature control unit 28 stops operation of the sub heater 24 in step S14 and maintains temperature control only by the main heaters 23*a* through 23*d*.

After steps S14 and S15, the temperature control unit 28 judges whether the power source of the light source device 10 has been turned off in step S16. When it is judged that the power source of the light source device 10 has been turned off in step S16, the temperature control unit 28 stops operation of both the main heaters 23*a* through 23*d* and the sub heater 24 in step S17. When it is judged that the power source of the light source device 10 has not been turned off in step S16, the process returns to step S12, where the temperature control unit 28 reads the elapsed time. The temperature of the polarization-inverted crystal 20 can be similarly controlled by these processes. The light source device 10 may switch to the control based on the temperature measured by the thermistor 27 after elapse of the set time from the time when the power source of the light source device 10 is turned on.

The light source unit of the light source device 10 may be constituted by diode pumped solid state (DPSS) laser, solid laser, liquid laser, gas laser, or others as well as the semiconductor element. The light source unit may be an array light source emitting a plurality of lights. The structure of the light source device 10 is not limited to that shown in this embodiment, but may be appropriately modified.

Figure 9:
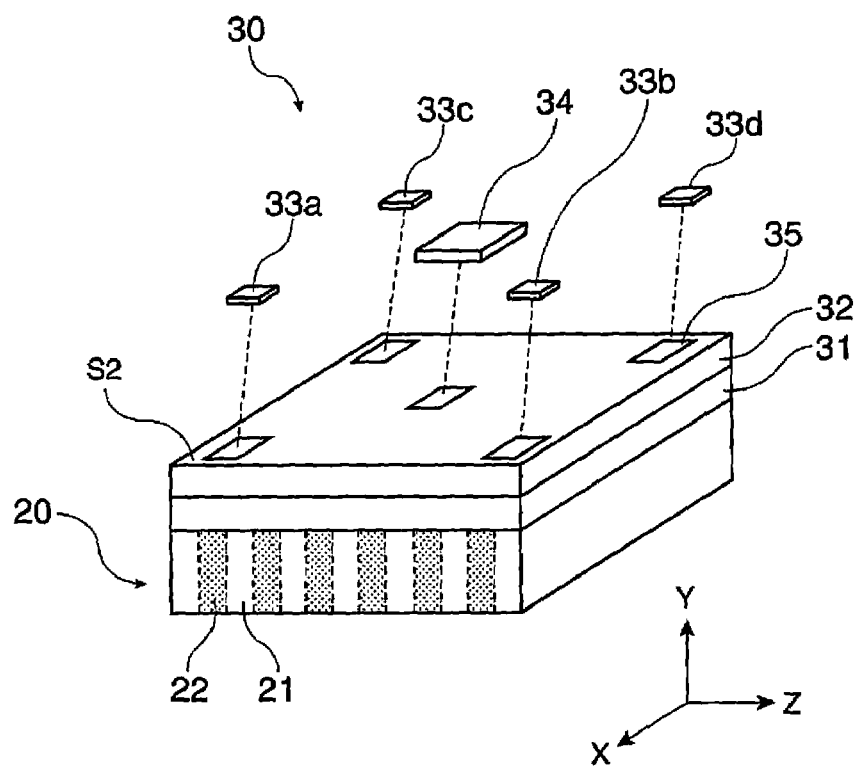
FIG. 9 illustrates a structure of an SHG element according to at least one embodiment.

FIG. 9 illustrates a structure of an SHG element 30 according to an embodiment. The SHG element 30 in this embodiment is applicable to the light source device 10 in at least one previously described embodiment(s) illustrated in FIGS. 1-8. The SHG element 30 according to this embodiment is characterized by a heat diffusing plate 31. Similar reference numbers are given to parts similar to those in the embodiment(s) illustrated in FIGS. 1-8, and the same explanation is not repeated. The heat diffusing plate 31 and an insulating layer 32 are disposed on the polarization-inverted crystal 20.

The heat diffusing plate 31 and the insulating layer 32 are rectangular components having substantially the same size as that of the polarization-inverted crystal 20. The heat diffusing plate 31 functions as a heat diffusing section which diffuses heat to be conducted to the polarization-inverted crystal 20. The heat diffusing plate 31 is made of metal material such as copper as a component having high heat conductivity. The insulating layer 32 is made of material having insulating characteristics such as epoxy resin.

Main heaters 33a through 33d and sub heater 34 are temperature control elements for controlling the temperature of the polarization-inverted crystal 20 by supplying heat to the polarization-inverted crystal 20. The main heaters 33a through 33d and the sub heater 34 are constituted by electric heaters, for example. The main heaters 33a through 33d and the sub heater 34 are disposed on the upper surface S2 of the SHG element 30. The upper surface S2 is the surface of the insulating layer 32 opposite to the heat diffusing plate 31 side. The upper surface S2 is the X-Z plane as the second plane substantially orthogonal to the X-Y plane as the first plane.

Figure 10:
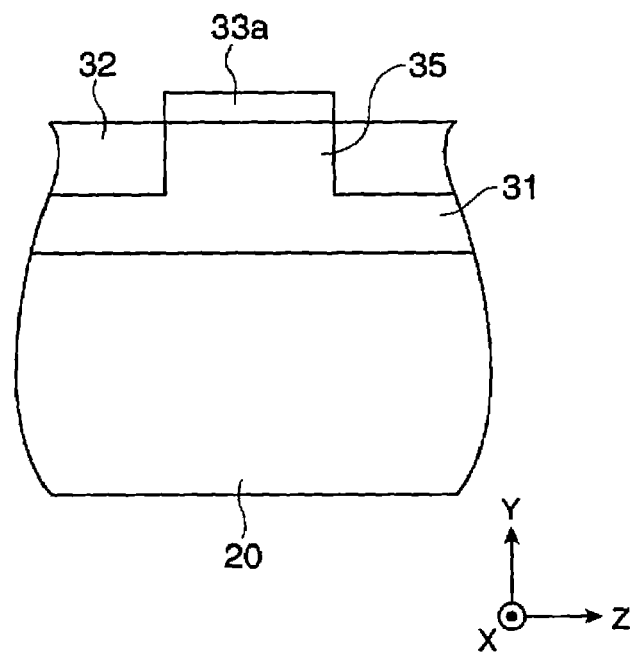
FIG. 10 illustrates a cross-sectional structure of a part of the SHG element shown in FIG. 9.

FIG. 10 illustrates the cross-sectional structure of the SHG element 30 at the position where the one main heater 33a is mounted. The heat diffusing plate 31 and the main heater 33a are connected by connecting section 35. The connecting section 35 penetrates through the insulating layer 32. The insulating layer 32 is positioned on the heat diffusing plate 31 opposite to the polarization-inverted crystal 20 side in the area other than the portion where the connecting section 35 is disposed. The connecting section 35 is made of material having higher thermal conductivity than that of the resin component constituting the insulating layer 32 such as copper, indium, and solder. The heat diffusing plate 31 and the connecting section 35 may be formed integrally with each other. Returning to FIG. 9, each of the main heaters 33a through 33d and the sub heater 34 is disposed on the corresponding connecting section 35. The not-shown thermistor is provided on the polarization-inverted crystal 20 similarly to that in the embodiment(s) illustrated in FIGS. 1-8. FIGS. 9 and 10 do not show wiring patterns and electrodes to be described below.

Figure 11:
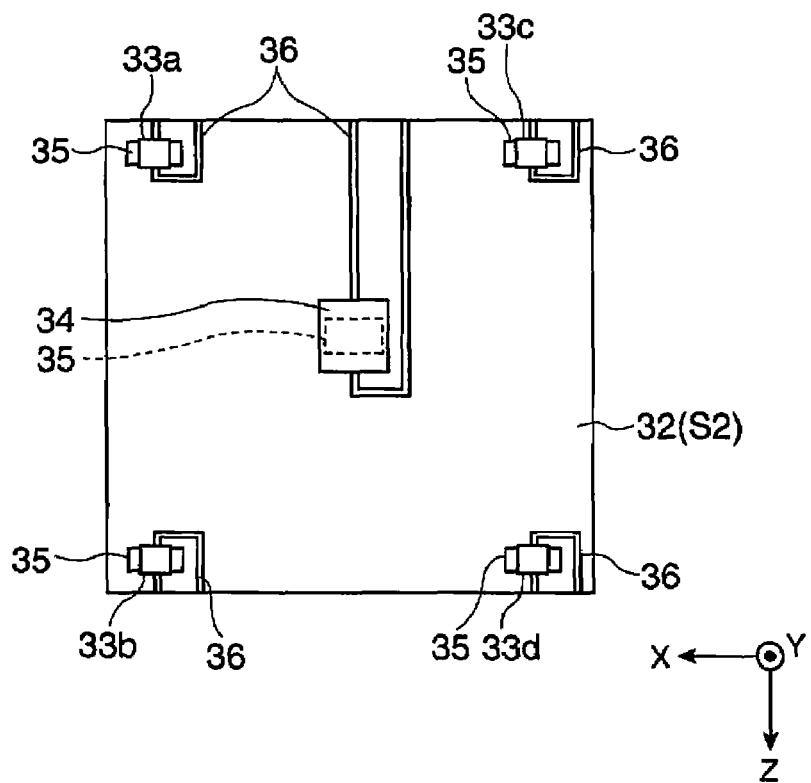
FIG. 11 illustrates a structure for driving main heaters and a sub heater.
Figure 12:
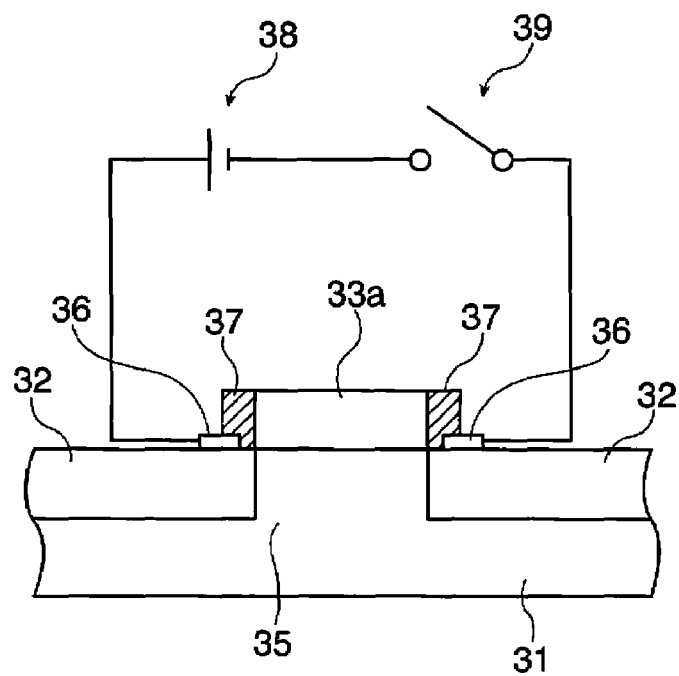
FIG. 12 illustrates a structure for driving main heaters and a sub heater.

FIGS. 11 and 12 illustrate a structure for operating the main heaters 33a through 33d and the sub heater 34. As illustrated in FIG. 11, wiring patterns 36 are provided on the insulating layer 32. The wiring patterns 36 are disposed on the insulating layer 32 opposite to the heat diffusing plate 31 side. The main heaters 33a through 33d and the sub heater 34 are connected with the wiring patterns 36.

As schematically illustrated in FIG. 12, electrodes 37 of the main heater 33a are connected with the wiring pattern 36. The wiring pattern 36 connects a power source 38, a heater driving unit 39, and the electrodes 37. The power source 38 supplies power to the main heater 33a. The heater driving unit 39 drives the main heater 33a in accordance with the control of the temperature control unit 28 (see FIG. 5). The electrodes 37 and the wiring pattern 36 are disposed on the insulating layer 32. Each of the other main heaters 33b, 33c, and 33d, and the sub heater 34 has a structure similar to that of the main heater 33a shown in FIG. 12.

Unnecessary continuity between the electrodes 37 and the wiring patterns 36 via the heat diffusing plate 31 can be cut off by the insulating layer 32. Moreover, assembly can be facilitated by directly disposing the main heaters 33a through 33d and the sub heater 34 on the insulating layer 32. The heat diffusing plate 31 and the connecting section 35 can be formed integrally with one another by etching the plate-shaped copper material in the area other than the connecting sections 35, for example. The insulating layer 32 may be formed by applying insulation material on the heat diffusing plate 31 in the area other than the connecting sections 35 are provided. The wiring patterns 36 may be formed by applying plating on the insulating layer 32 and the connecting sections 35 to form copper foil, and then patterning and etching the copper foil. The time required for mounting the main heaters 33a through 33d and the sub heater 34 can be reduced by forming the wiring patterns 36 on the insulating layer 32.

Heat generated from the main heaters 33a through 33d and the sub heater 34 is conducted to the polarization-inverted crystal 20 via the connecting sections 35 and the heat diffusing plate 31. The temperature of the polarization-inverted crystal 20 can be more equalized when the heat diffusing plate 31 is provided. Moreover, the heat from the main heaters 33a through 33d and the sub heater 34 is efficiently conducted to the heat diffusing plate 31 by using the connecting sections 35. Thus, conversion of the light wavelength with high efficiency can be similarly achieved in this embodiment.

Figure 13:
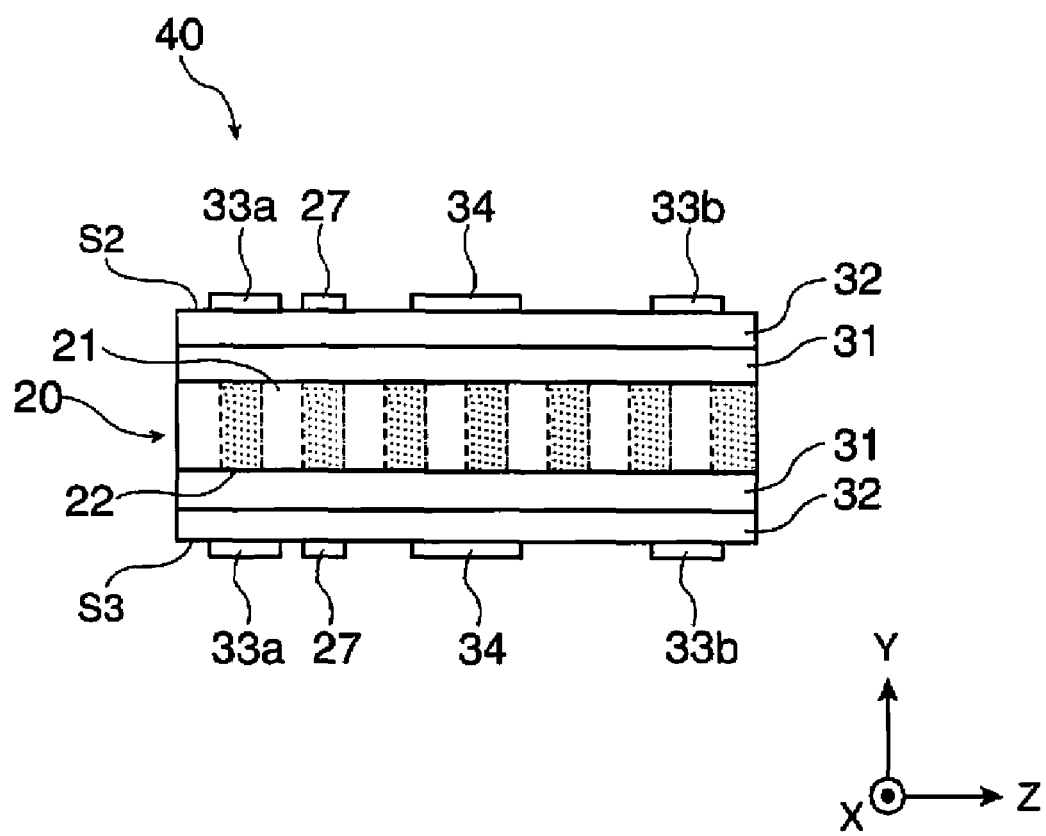
FIG. 13 illustrates a side structure of an SHG element according to certain embodiments.

FIG. 13 illustrates the side structure of an SHG element 40 in another embodiment. The SHG element 40 in this modified example has the main heaters 33a through 33d and the sub heater 34 on the upper surface S2 and a bottom surface S3 of the SHG element 40. The bottom surface S3 is the third plane opposite to the upper surface S2 as the second plane of the SHG element 40. The main heaters 33a through 33d and the sub heater 34 mounted on the bottom surface S3 are disposed at positions similar to those of the main heaters 33a through 33d and the sub heater 34 mounted on the upper surface S2. The thermistor 27 is provided on each of the upper surface S2 and the bottom surface S3.

The temperature can be uniformly controlled in the Y-axis direction orthogonal to the directions of the upper surface S2 and the bottom surface S3 by disposing the main heaters 33a through 33d and the sub heater 34 on each of the upper surface S2 and the bottom surface S3. The thermistors 27 may be mounted on the connecting sections 35 similarly to the main heaters 33a through 33d and the sub heater 34. By this method, the temperature of the polarization-inverted crystal 20 can be accurately measured. The thermistor 27 of the SHG element 30 discussed above may be mounted on the insulating layer 32.

The main heaters 23a through 23d and the sub heater 24 of the SHG element 14 according to previously described embodiments (see FIG. 2) may be disposed on the bottom surface of the polarization-inverted crystal 20 opposite to the upper surface S1. The numbers, shapes, arrangements of the main heater and sub heater provided on the SHG element in each of the embodiments are not limited to those specified herein, but may be arbitrarily changed. For example, the main heaters and sub heater of the SHG elements 30 or 40 according to the embodiments may be concentrated within a certain area when heat can be sufficiently diffused by the heat diffusing plate 31. Also, a plurality of sub heaters are allowed to be provided.

While Peltier elements or electric heaters are used as the first temperature controlling element and the second temperature controlling element in embodiments previously described herein, the first and second temperature controlling elements are not limited thereto, as the temperature may be controlled by controlling energy of infrared beam radiation or the like. While the structure disposing the temperature control elements on the central areas and the peripheral areas of the upper surfaces S1 and S2 and the bottom surface S3 has been described, the plural temperature control elements may be disposed substantially at the centers of the upper surfaces S1 and S2 and the bottom surface S3. For example, two temperature controlling elements having the same capacity are provided at the center. In this case, the two temperature controlling elements are operated only at the startup, and one of these elements is used in the normal condition.

Figure 14:
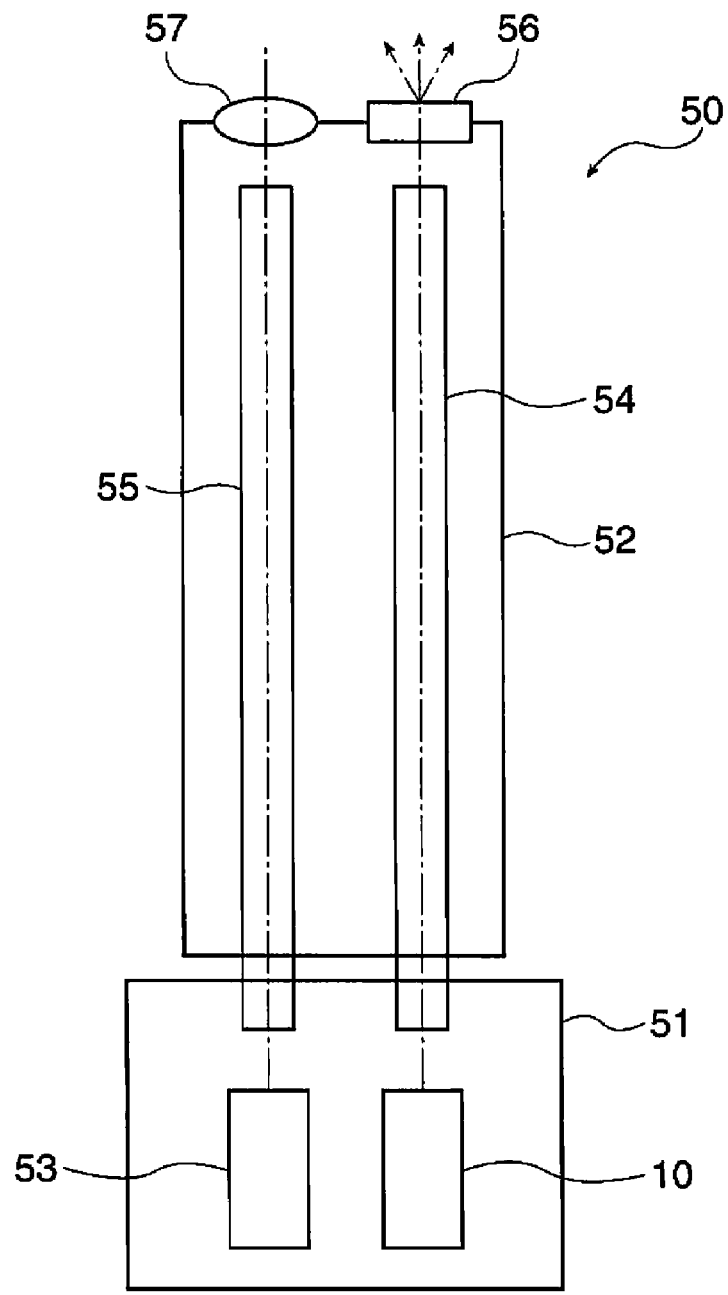
FIG. 14 illustrates a general structure of a monitoring device in accordance with certain embodiments.

FIG. 14 illustrates a general structure of a monitoring device 50 according to an embodiment. The monitoring device 50 includes a device main body 51 and a light transmitting unit 52. The device main body 51 has the light source device 10 (see FIG. 1) of at least one of the embodiment(s)

illustrated in FIGS. 1-8, and the same explanation as that in such embodiment(s) are not repeated herein. The light transmitting unit 52 has two light guides 54 and 55. A diffusing plate 56 and an image forming lens 57 are disposed at the end of the light transmitting unit 52 on the subject (not shown) side. The first light guide 54 transmits light emitted from the light source device 10 to the subject (e.g. illumination target). The diffusing plate 56 is disposed on the emission side of the first light guide 54. The light transmitted within the first light guide 54 passes through the diffusing plate 56 to be diffused on the subject side. The respective parts provided on the optical path from the light source device 10 to the diffusing plate 56 constitute a lighting device for illuminating the subject.

The second light guide 55 transmits the light coming from the subject to a camera 53. The image forming lens 57 is provided on the light entrance side of the second light guide 55. The image forming lens 57 converges the light coming from the subject on the light entrance surface of the second light guide 55. The light from the subject enters the second light guide 55 via the image forming lens 57, travels inside the second light guide 55, and enters the camera 53.

Each of the first light guide 54 and the second light guide 55 is constituted by a number of optical fibers, for example. When the optical fibers are used, laser beams can be transmitted to the distance. The camera 53 is contained within the device main body 51. The camera 53 is an image pickup unit which picks up/captures an image of the subject illuminated by the light emitted from the light source device 10. When the light coming through the second light guide 55 enters the camera 53, the camera 53 forms an image of the subject. By using the light source device 10 according to the embodiment(s) illustrated in FIGS. 1-8, a stable amount of light can be supplied with high efficiency. Accordingly, a bright image can be monitored by using the light supplied with high efficiency. The monitoring device 50 may include any of the SHG elements according to the embodiments described herein.

Figure 15:
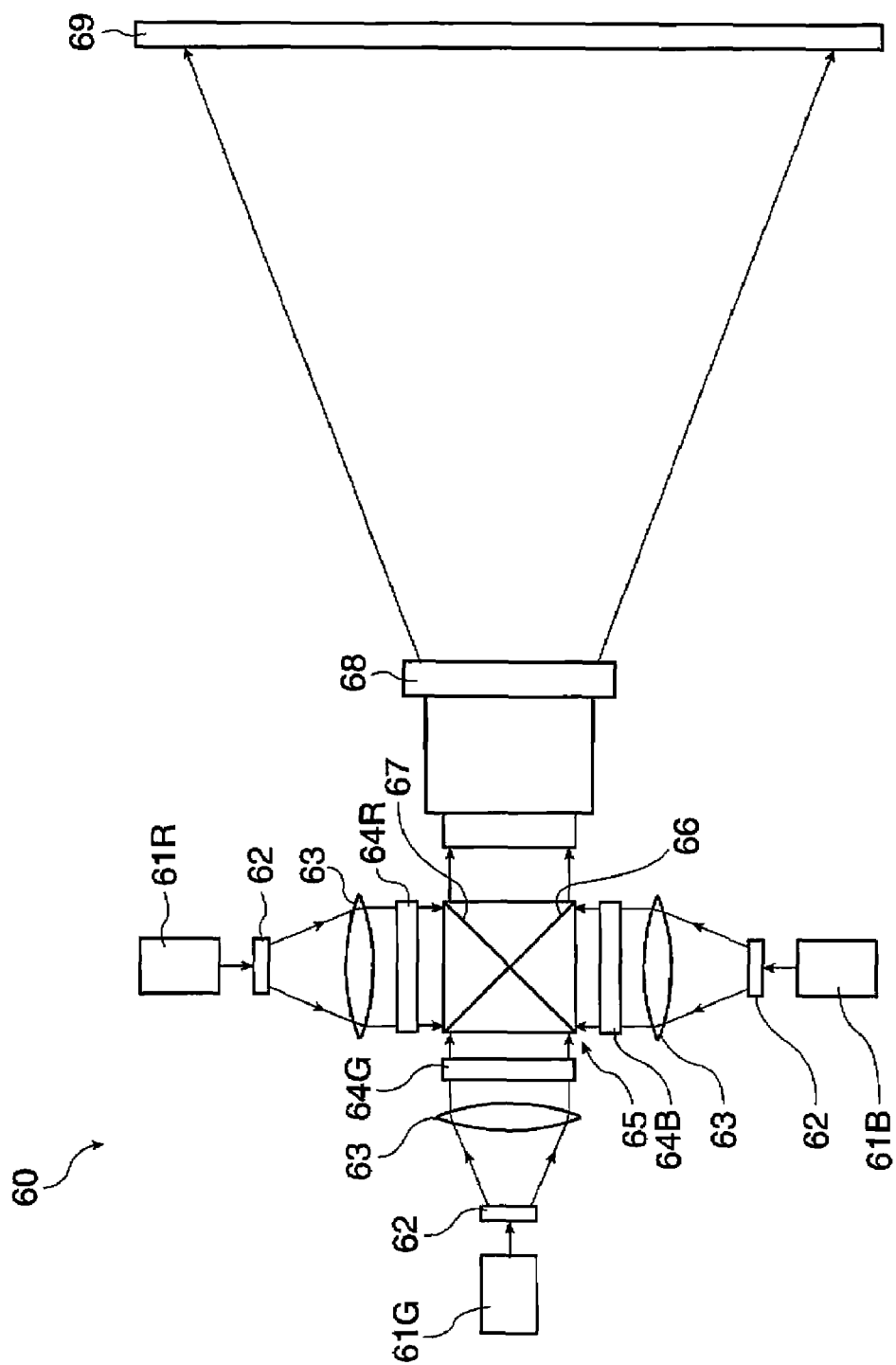
FIG. 15 illustrates a general structure of a projector in accordance with certain embodiments.

FIG. 15 illustrates a general structure of a projector 60 according to an embodiment. The projector 60 is a front-projection-type projector which supplies light onto a screen 69 and produces an image to be observed by using the light reflected by the screen 69. The projector 60 has a red color (R) light source device 61R, a green color (G) light source device 61G, and a blue color (B) light source device 61B. Each of the color light source devices 61R, 61G and 61B has a structure similar to that of the light source device 10 illustrated in the embodiments of FIGS. 1-8 (see FIG. 1), and the same explanation is not repeated herein. The projector 60 displays images using lights emitted from the respective color light source devices 61R, 61G and 61B.

The R color light source device 61R is a light source device for supplying R light. A diffusing element 62 shapes and enlarges the illumination area and equalizes the light amount distribution of laser beam in the illumination area. The diffusing element 62 is constituted by computer generated hologram (CGH) as a diffraction optical element, for example. A field lens 63 collimates the laser beam emitted from the R color light source device 61R and supplies the laser beam to an R color spatial light modulating device 64R. The R color light source device 61R, the diffusing element 62, and the field lens 63 constitute a lighting device which illuminates the R color spatial light modulating device 64R. The R color spatial light modulating device 64R is a spatial light modulating device which modulates R light emitted from the lighting device according to an image signal, and is constituted by a transmission type liquid crystal display device. The R light modulated by the R color spatial light modulating device 64R enters a cross dichroic prism 65 as a light combining system.

The G color light source device 61G is a light source device for supplying G light. The laser beam having passed through the diffusing element 62 and the field lens 63 enters the G color spatial light modulating device 64G. The G color light source device 61G, the diffusing element 62, and the field lens 63 constitute a lighting device for illuminating the G color spatial light modulating device 64G. The G color spatial light modulating device 64G is a spatial light modulating device which modulates G light emitted from the lighting device according to an image signal, and is constituted by a transmission type liquid crystal display device. The G light modulated by the G color spatial light modulating device 64G enters the cross dichroic prism 65 from a side different from the side to which the R light enters.

The B color light source device 61B is a light source device for supplying B light. The laser beam having passed through the diffusing element 62 and the field lens 63 enters the B color spatial light modulating device 64B. The B color light source device 61B, the diffusing element 62, and the field lens 63 constitute a lighting device for illuminating the B color spatial light modulating device 64B. The B color spatial light modulating device 64B is a spatial light modulating device which modulates B light emitted from the lighting device according to an image signal, and is constituted by a transmission type liquid crystal display device. The B light modulated by the B color spatial light modulating device 64B enters the cross dichroic prism 65 from a side different from the sides to which the R and G lights enter. The transmission type liquid crystal display device is constituted by a high temperature polysilicon (HTPS) TFT liquid crystal panel, for example.

The cross dichroic prism 65 has two dichroic films 66 and 67 disposed substantially orthogonal to each other. The first dichroic film 66 reflects R light and transmits G and B lights. The second dichroic film 67 reflects B light and transmits R and G lights. The cross dichroic prism 65 combines R, G and B lights entering in different directions and emits the combined light toward a projection lens 68. The projection lens 68 projects the light combined by the cross dichroic prism 65 onto the screen 69.

By using the respective color light source devices 61R, 61G and 61B having the structure similar to that of the light source device 10, a stable amount of laser beams can be supplied with high efficiency. Accordingly, a bright image can be displayed in a stable manner. Each of the light source devices 61R, 61G and 61B may include any of the SHG elements described in the respective embodiments. The projector 60 may include the R color light source device 61R emitting fundamental wave light from the light source unit without change by the SHG element, and the G color and B color light source devices 61G and 61B having the same structure as that of the light source device 10, for example.

The projector is not limited to the structure including the transmission type liquid crystal display device as the spatial light modulating device. The spatial light modulating device may be a reflection type liquid crystal display device (liquid crystal on silicon (LCOS), DMD (digital micromirror device), GLV (grating light valve), and others. The projector is not limited to the structure including spatial light modulating devices for the respective colors. The projector may modulate two, three, or more color lights by using one spatial light modulating device. The projector is not limited to the type which includes the spatial light modulating devices, but may be a laser scan type projector which performs laser beam scanning of laser beams emitted from the light source device by using a scanning unit such as galvanomirror and displays an image on a beam receiving surface. The projector may be a slide projector which uses a slide containing image information. The projector may be a so-called rear projector which supplies light on one of the surfaces of the screen and produces an image to be observed by using the light released from the other surface of the screen.

The light source device according to each of the embodiments of the disclosure is applicable to optical systems of an exposure device using laser beams, laser processing device, and others as well as the monitoring device and projector.

Accordingly, the wavelength converting element according to each of the embodiments is appropriately used as light sources of, for example, a monitoring device or a projector.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A wavelength converting element configured to receive light having a first wavelength and produce light having a second wavelength different from the first wavelength, comprising:
    a polarization-inverted crystal comprising polarization-inverted layers having an inverted polarization direction and being disposed in parallel in a particular direction and disposed substantially parallel with a first plane which is substantially orthogonal to the particular direction; and
    a plurality of temperature controlling elements configured to control a temperature of the polarization-inverted crystal, the temperature controlling elements being disposed on a second plane substantially orthogonal to the first plane.

2. The wavelength converting element according to claim 1, wherein the temperature controlling elements comprise a first temperature controlling element having a capacity and a second temperature controlling element having a capacity, the capacity of the second temperature controlling element being larger than the capacity of the first temperature controlling element.

3. The wavelength converting element according to claim 2, wherein:
    the first temperature controlling element and the second temperature controlling element are configured to supply heat so that the temperature of the polarization-inverted crystal becomes a substantially set temperature; and
    the second temperature controlling element is configured to begin to stop providing heat when a difference between the set temperature and the temperature of the polarization-inverted crystal reaches a predetermined value.

4. The wavelength converting element according to claim 2, wherein the second temperature controlling element is disposed substantially at the center of the second plane.

5. The wavelength converting element according to claim 1, further comprising a heat diffusing section configured to diffuse heat from the temperature controlling elements to the polarization-inverted crystal.

6. The wavelength converting element according to claim 5, further comprising:
    connecting sections formed in an area to connect the temperature controlling elements with the heat diffusing section; and
    an insulating layer disposed on the heat diffusing section on a side opposite to the polarization-inverted crystal and in an area other than the area having the connecting sections.

7. The wavelength converting element according to claim 1, further comprising a heat releasing section disposed on the temperature controlling elements on a side opposite to the polarization-inverted crystal to radiate heat.

8. The wavelength converting element according to claim 1, wherein at least another temperature controlling element is disposed on a third plane that is opposite to the second plane.

9. The wavelength converting element according to claim 1, wherein the polarization-inverted crystal further includes spontaneous polarization layers alternately arranged in parallel with the polarization-inverted layers in the particular direction, the spontaneous polarization layers retaining a spontaneous polarization direction of the polarization-inverted crystal.

10. The wavelength converting element according to claim 1, wherein the temperature controlling elements are controlled based on at least one of an elapsing of a predetermined time and a detection of a predetermined temperature.

11. The wavelength converting element according to claim 1, wherein the temperature controlling elements comprise a main heater and a sub-heater.

12. The wavelength converting element according to claim 11, wherein the main heater and the sub-heater are comprised of Peltier elements.

13. The wavelength converting element according to claim 1, wherein the temperature controlling elements comprise two or more main heaters and the main heaters are configured to be individually controlled.

14. A light source device, comprising:
    a light source unit configured to emit light having the first wavelength; and
    the wavelength converting element according to claim 1 configured to receive the light from the light source unit.

15. A lighting device comprising the light source device according to claim 14 and configured to illuminate an illumination target using light emitted from the light source device.

16. A monitoring device, comprising:
    the lighting device according to claim 15; and
    an image-pickup unit configured to capture an image of a subject illuminated by the lighting device.

17. A projector comprising the light source device according to claim 14 and configured to display an image using light emitted from the light source device.

* * * * *